US008131591B2

(12) United States Patent
Gorty et al.

(10) Patent No.: US 8,131,591 B2
(45) Date of Patent: Mar. 6, 2012

(54) UPDATING CONTENTS OF ASYNCHRONOUSLY REFRESHABLE WEBPAGES

(75) Inventors: Sunitha Gorty, Redmond, WA (US); Mark Masterson, Seattle, WA (US); Scott Tomlin, Bellevue, WA (US); Mansoor Malik, Kirkland, WA (US); Hyejin Yun, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/853,908

(22) Filed: Sep. 12, 2007

(65) Prior Publication Data
US 2009/0070190 A1 Mar. 12, 2009

(51) Int. Cl.
*G06Q 30/00* (2006.01)
(52) U.S. Cl. .................................... 705/14.4
(58) Field of Classification Search .......... 705/10, 705/14.4
See application file for complete search history.

(56) References Cited

U.S. PATENT DOCUMENTS

| 5,740,549 | A  | * | 4/1998  | Reilly et al. ............ 705/14.42 |
|-----------|----|---|---------|------------------------------------|
| 6,813,640 | B1 |   | 11/2004 | Benson et al.                      |
| 7,136,871 | B2 |   | 11/2006 | Ozer et al.                        |
| 7,155,663 | B2 | * | 12/2006 | Landsman et al. ............ 715/200 |
| 2002/0007393 | A1 |   | 1/2002 | Hamel                              |
| 2005/0033700 | A1 |   | 2/2005 | Vogler et al.                      |
| 2006/0004627 | A1 |   | 1/2006 | Baluja et al.                      |
| 2006/0294258 | A1 |   | 12/2006 | Powers-Boyle et al.                |
| 2007/0078714 | A1 |   | 4/2007 | Ott et al.                         |
| 2007/0130012 | A1 |   | 6/2007 | Yruski et al.                      |
| 2007/0168259 | A1 | * | 7/2007 | Haberman et al. ............ 705/26 |
| 2008/0098301 | A1 | * | 4/2008 | Black et al. ............ 715/246 |
| 2008/0301643 | A1 | * | 12/2008 | Appleton et al. ............ 717/124 |
| 2009/0043657 | A1 | * | 2/2009 | Swift et al. ............ 705/14 |
| 2010/0180029 | A1 | * | 7/2010 | Fourman ............ 709/225 |

FOREIGN PATENT DOCUMENTS

WO WO0067176 A2 11/2000

OTHER PUBLICATIONS

"Measuring Users' Web Activity to Evaluate and Enhance Advertising Effectiveness", http://www.allbusiness.com/technology/internet-technology/330977-5.html.
"Unintrusive Customization Techniques for Web Advertising", http://citeseer.ist.psu.edu/cache/papers/cs/8049/http:zSzzSzwww.cs.washington.eduzSzhomeszSzmarclangzSzadwiz-www8zSzadwiz-www8.pdf/unitrusive-customization-techniques-for.pdf.

* cited by examiner

*Primary Examiner* — Thomas Dixon
(74) *Attorney, Agent, or Firm* — Shook, Hardy & Bacon L.L.P.

(57) ABSTRACT

Embodiments of the invention provide ways to update and permit third-party advertising content of a webpage developed using Asynchronous JavaScript and XML ("AJAX") techniques. An illustrative method includes registering a set of possible triggering events that can invoke an advertisement-update process, registering advertisement containers (portions of the webpage that can present the advertisements), receiving an indication that a triggering event has occurred, identifying (in some cases) advertisement containers whose advertisement content is to be updated, accessing third-party advertisement data that is stored outside of the domain of the webpage to receive the fresh advertising content, and presenting the fresh advertising content in the one or more advertisement containers.

13 Claims, 8 Drawing Sheets

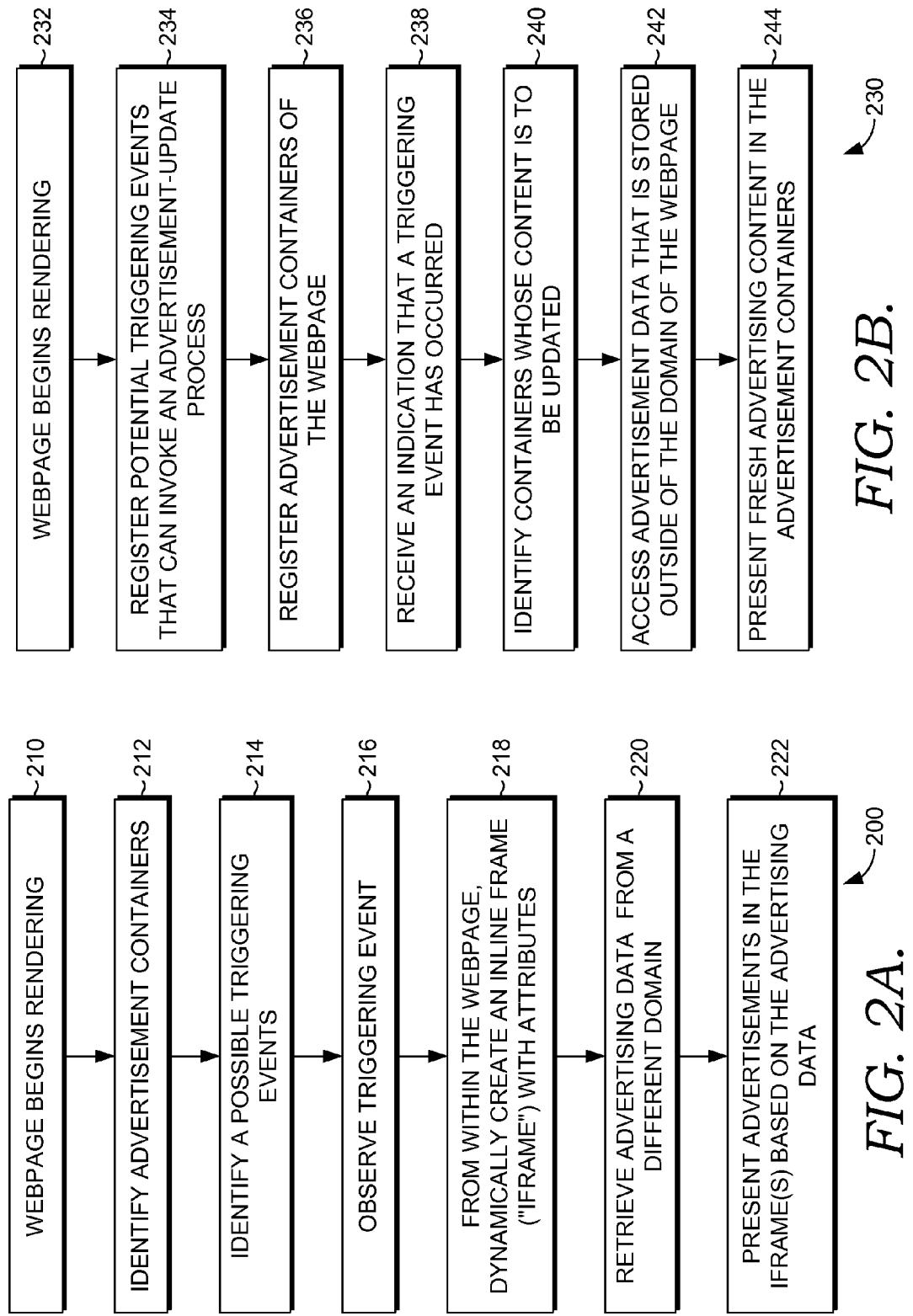

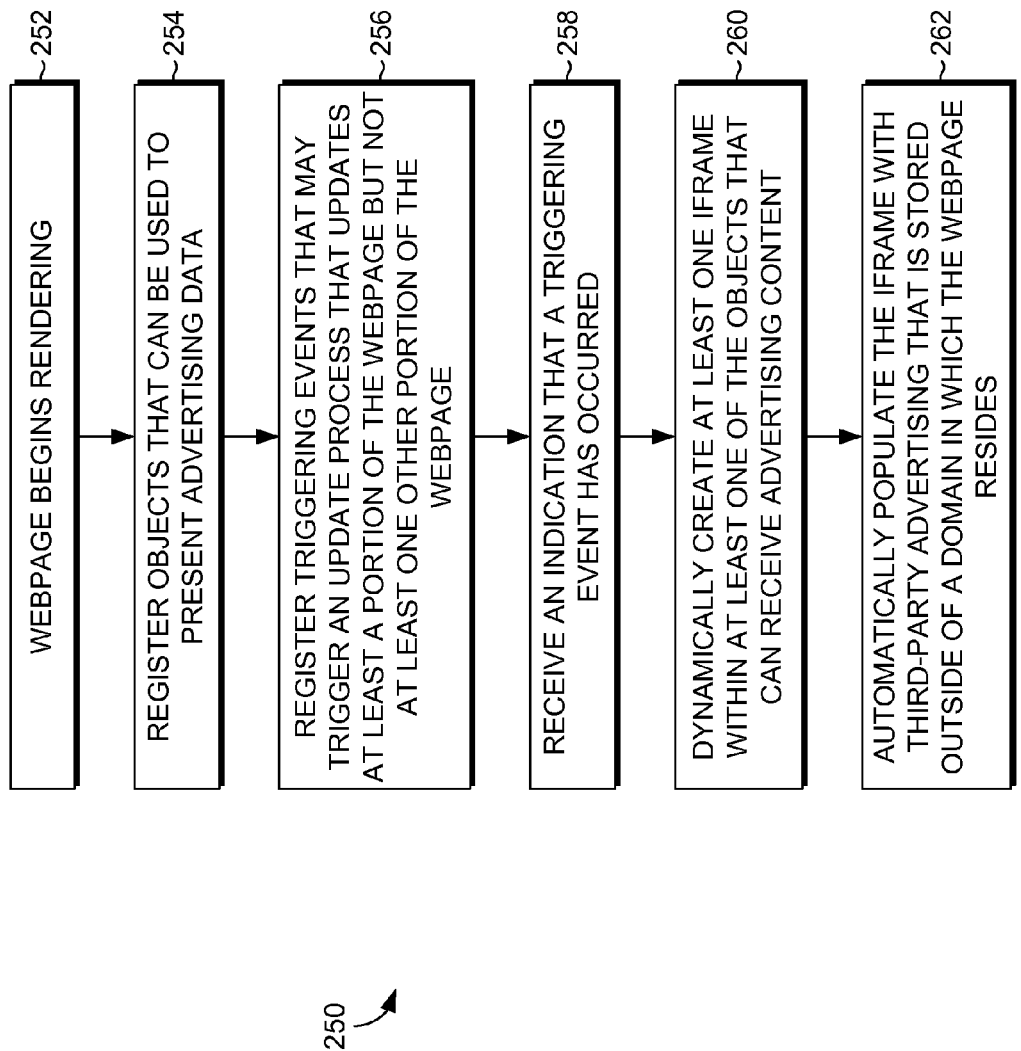

UPDATING CONTENTS OF ASYNCHRONOUSLY REFRESHABLE WEBPAGES

SUMMARY

The invention is defined by the claims below, but summarily, embodiments of the invention enable all portions of a webpage to be updated even when the webpage is coded in such a way that certain portions of it can be refreshed without having to refresh the entire page (such as when webpages are coded using AJAX techniques, JSON techniques and the like) AJAX stands for "Asynchronous Javascript and XML," and JSON stands for JavaScript Object Notation.

For example, a portion of a menu structure of a webpage may not change even though a content-presentation portion may change. If items such as advertisement containers are situated in the first portion, they can be updated using embodiments of the invention even though they reside in a portion that is not refreshed when the other portion is. Embodiments allow for a registration process to occur, generally as the webpage is being rendered. During this registration process, objects with content that is to be updated are registered, and so too are potential triggering events that, if happen, trigger an update process. With the objects and potential triggering events registered, a portion of code can monitor the occurrence of a triggering event. When one occurs, any object registered can be refreshed. And because a publisher's own objects are used to house the refreshed content, advertising data can be utilized even though it resides in a different domain from that of the webpage. Further, attributes of the objects that present the new content can be manipulated because there are no security issues because the advertising-housing objects were created in the same security context as the webpage. Thus, the objects can be resized, moved, etc.

BRIEF DESCRIPTION OF THE SEVERAL VIEWS OF THE DRAWINGS

Embodiments of the invention are described in detail below with reference to the drawing figures, which form a part of this disclosure, and are incorporated by reference herein, and wherein:

FIGS. 2A-2C are flowcharts that depict illustrative ways of carrying out the various aspects of embodiments of the present invention.

DETAILED DESCRIPTION

Throughout the description, various embodiments of the invention and several acronyms and shorthand notations are used to aid the understanding of certain aspects of the invention. These acronyms and shorthand notations are intended for the purpose of providing an easy methodology of communicating the ideas expressed herein and are not meant to limit the scope of the invention. The following is a list of these acronyms:

| Acronym/Shorthand | Phrase |
|---|---|
| AJAX | Asynchronous Javascript And XML (and equivalents) |
| iframe (or iFrame) | inline frame |
| Network Browser | Internet/web browser |

Illustrative aspects of the invention will be described in greater detail below. Listing some aspects should not be construed as an indication that other aspects do not exist. One embodiment of our technology includes one or more computer-readable media having computer-executable instructions embodied thereon for performing a method of enabling advertisement data that is stored outside of a first domain to source advertisements on a webpage that is within the first domain even when the webpage includes a first portion that can be updated independently of updating a second portion, the method comprising: registering a set of possible triggering events that can invoke an advertisement-update process; registering a set of advertisement containers, which are portions of the webpage that can present the advertisements; receiving an indication that a triggering event has occurred, the triggering event being one of the set of possible triggering events; identifying one or more of the advertisement containers whose advertisement content is to be updated, thereby defining a set of identified advertisement containers; accessing the advertisement data that is stored outside of the first domain to receive the fresh advertising content; presenting the fresh advertising content in the one or more advertisement containers. Those of ordinary skill in the art would appreciate that computer-readable media can take the form of magnetic-based media and/or optical-based media, which are two illustrative types of media that are readable by a computing device such as computing device 112.

Figure 1:
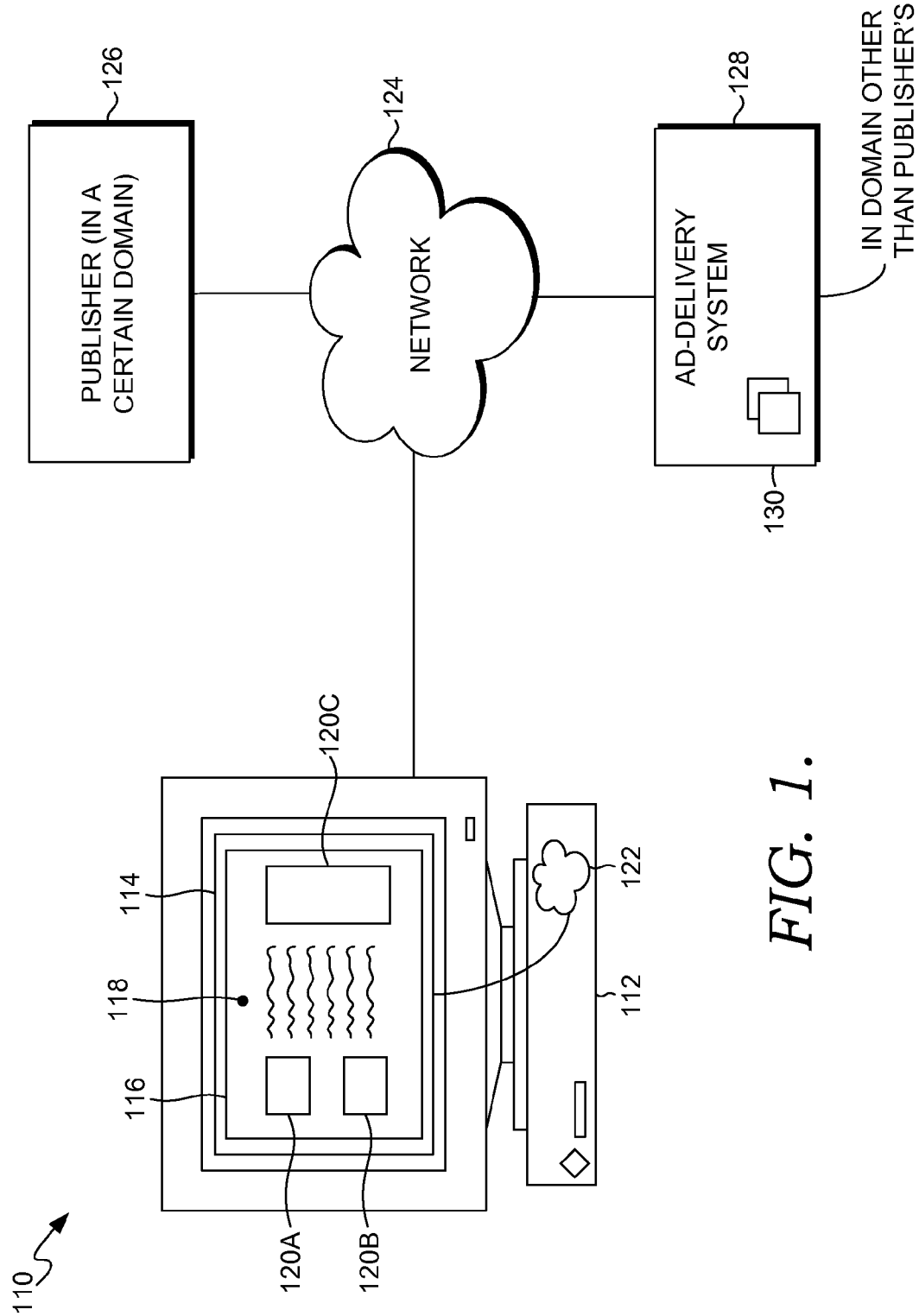
FIG. 1 depicts an illustrative operating environment suitable for practicing an embodiment of the invention.

Turning now to FIG. 1, an illustrative operating environment suitable for practicing an embodiment of the present invention is provided and referenced generally by the numeral 110. Operating environment 110 includes a computing device 112. Computing device 112 may be any of a personal-computing device, server computer, personal data assistant, smart phone, or any other consumer-electronics device that is capable of rendering a webpage and presenting it to a user. For illustrative purposes, and so as to not obscure various aspects of the present invention, we will discuss computing device 112 as though it is a computer.

As illustratively shown, computing device 112 includes a display for presenting a network browser 114. In some embodiments, network browser 114 is a web browser. Illustrative web browsers include Internet Explorer, Safari, Opera, Netscape, and various other products.

Web browser 114 presents a webpage 116. Webpage 116 is composed of various objects, including a variety of objects not shown so as to not obscure the invention. A few illustrative objects are shown, such as a first portion 118, which illustratively includes some text, and could include a variety of other web objects. A second portion of a website is included and is depicted as being composed of three objects. The objects are advertisement containers, and are referenced by numerals 120A, 120B, and 120C. These will variously be referred to collectively as numeral 120 when doing so will simplify reading the instant disclosure. Advertisement containers 120 are web objects that can hold and present advertising content to a user.

An application 122 is illustratively shown as being run on computing device 112. As will be explained in greater detail below, application 122 facilitates various aspects of the present invention. In some embodiments, application 122 is nothing more than a portion of embodied code that is executed by web browser 114. Thus, although we refer to application 122 as a "application," we do not mean to convey that it is necessarily a stand-alone software application, and certainly not that such a stand-alone application is required. Rather, as previously mentioned, application 122 may be as small as a portion of programmatic code, or an application program interface (API), that is utilized by web browser 114 to carry out various functional aspects of the invention.

In the illustrative operating environment shown, computing device 112 is coupled by network 124 to a publisher 126 as well as to an ad-delivery system 128. Publisher 126 resides in a different domain than ad-delivery system 128. Publisher 126 provides the information necessary to render webpage 116. Thus, we will variously refer to a webpage being in a first or a certain domain, and advertising content or data 130 residing in a different domain. By this, we mean to convey that publisher 126 includes publishing information that allows webpage 116 to be rendered in a certain domain. But ad-delivery system 128 resides in a different domain.

For example, an illustrative publisher may be Microsoft. Its corresponding domain may be microsoft.com, but an ad-delivery system may reside in acme.com. Thus, the two are in different domains. Ad-delivery system 128 is shown as including or having access to advertisement data 130. As will be described in greater detail below, advertisement data 130 can be used to source advertisements that will be presented in advertisement containers, such as advertisement containers 120A-C.

Historically, this has not been possible in an AJAX environment. AJAX is a web-development technique that is used for creating interactive web applications. One of the benefits of this technique is that it allows webpages to be created where certain parts are refreshed without refreshing other parts. Thus, a webpage may be composed of various objects such as text boxes, containers, menus, etc. It may be the case that a certain portion of a webpage remains unchanged while a different portion of the webpage has its content updated. AJAX is shorthand for Asynchronous JavaScript and XML.

AJAX is asynchronous to the extent that loading of certain web content or documents does not interfere with other portions of a webpage. AJAX is substantially platform independent and can be used in connection with various operating systems, types of computers, network browsers, etc.

Whereas AJAX offers a benefit in that a user can interface with objects in a web browser more along the lines of the way that they interact with stand-alone software products, it offers a shortcoming in the eyes of others. For example, advertisers can be frustrated by a programming environment that utilizes AJAX because its advertisements will not be refreshed as often as they would in a non-AJAX environment. Historically, when a webpage loads, the content of a webpage is initially presented to a user. The webpage may be composed of various objects. Those objects may include advertising content.

At least in the past, whenever a user acts on a control or generally interacts with the webpage, the page is refreshed. When the page was refreshed, all of the advertising content has historically been refreshed as well. Advertisers liked this. It gave them an opportunity to present multiple ads to users. The more ad views, the better. Thus, in advertising models that are based on new impressions, the historic technology that updates all content of a webpage whenever any portion of a webpage is acted upon or interacted with serves as a good model to base pricing and other advertisement decisions. But in environments such as an AJAX environment, or any other environment or programming technique that offers the ability for a first portion of a website to be updated asynchronously with respect to another portion, the historic way of determining effectiveness of the advertising is frustrated.

One feature offered by an embodiment of the present invention allows all advertising content of a webpage to be updated even in an asynchronous-type environment. Thus, embodiments of the present invention can be used in connection with AJAX programming to enable advertising content in a first portion of a website to be updated when a user interacts with a second portion of the website even though the entire page is not refreshed when that user interacts with the second portion of the website.

Another feature offered by embodiments of the invention is that the advertising content that can be refreshed can reside in a different domain from that of the publisher's content. That is, according to embodiments of the invention, advertising data that resides in a first domain can be used to refresh advertisements of a webpage that resides in another domain. Historically, this has not been possible because of the way that webpages are programmed and of how web browsers render webpages.

Cross domains do not allow refreshed advertisements to interact with a hosting page in rich manners, such as hovering or moving over the host. Disparate security contexts also hamper global page refreshing in asynchronous contexts. The webpage usually is associated with a first security context. When new frames or objects are created, or attempted to be created by a third party, they are done so in a different security context. Because the security contexts are not the same, a webpage will not allow a third party to interact with it at the level needed to refresh advertising content that resides in a disparate domain.

But embodiments of the present invention address both of these issues, among others. Namely, they allow asynchronous updating of webpage content even when the webpage is developed using asynchronous techniques, and they allow advertising in a domain other than that of a website to be used to refresh advertising in the webpage.

Turning now to FIG. 2A, a first illustrative method of allowing such refreshing of content is provided and referenced generally by the numeral 200. At a step 210, a webpage begins to be rendered. This webpage may be webpage 116 for example. As the webpage is being rendered by web browser 114 in one embodiment, application 122 identifies advertisement containers at a step 212. In an illustrative embodiment, this would include identifying containers 120A, 120B, and 120C. Now, application 122 is aware of all of the different containers that can present advertising content, irrespective of whether these containers reside in portions that might otherwise be asynchronously updated.

At a step 214 application 122 identifies possible triggering events that will lead to refreshing the advertising content of containers 120. An Illustrative triggering event includes clicking on an object that is in either the first or second portion of a webpage. A first portion of a webpage may be a portion that is not updated even when a user interacts with it. Data can be presented in a second portion of a webpage that does update.

Other illustrative triggering events include initiating a refresh process associated with either the first or second portion of the webpage. Perhaps a user refreshes a portion of a webpage, either the first or the second portion. A webpage can be often be refreshed by selecting an icon in a person's web browser, or also by a keystroke such as pressing "F5." Another illustrative triggering event may be an indication of data that has been inputted into a first or second webpage.

Thus, for example, a user may enter text into a text box, and press the "enter" key. Pressing the "enter" key indicates a completion of inputting data into a component of a webpage. Another way that data can be signified as having been inputted is by clicking a button. Thus a user may click an "okay" or "accept" button. Clicking either of these buttons would convey to the webpage a completion of inputting data. There are a myriad of other ways to indicate that data is to be inputted into the webpage, all of which are contemplated within the scope of the present invention.

Another illustrative triggering event may be indicating that an object in the first or second portion of a webpage is to be focused upon. When an object has the focus, it is an object of interest. Sometimes, this can occur by clicking on the object. Other times, an object can obtain the focus by a series of keystrokes, such as serially pressing the "tab" key.

Another illustrative triggering event includes activating a link in any of the first or second portions of the webpage. Activating a link is often accomplished by clicking on a link, such as a hyperlink. Another way of activating a link is to give that link the focus, and then press the "enter" key. In still other embodiments, a link can be activated by an audible command. There are many other types of triggering events that are not mentioned so as to not obscure the present invention, but are contemplated within its scope. Any triggering event that is desired to be made known can be made known by registering it via application 122. After step 214, application 122 is aware of various types of triggering events that, if occur, will trigger an advertisement-update process in one embodiment.

Finally, a triggering event need not be caused by a user. Father, it can be caused in other ways, such as a time-based event. Thus, in some embodiments a triggering event is merely a lapse of a prescribed amount of time. This would allow for a periodic refresh to occur, and even though a refresh occurs in a first portion of the website, that refresh can cause a refresh to occur in the other portion of the website.

At a step 216, application 122 observes a triggering event. Thus, one of the aforementioned triggering events occurs. According to an embodiment of the present invention, rather than merely carrying out the action associated with the event, application 122 is aware of and observes the occurrence of the triggering event. Thus, it is able to begin a process that will ultimately lead to refreshing the advertisement content in any container previously identified in step 212.

At a step 218, and from within the webpage, an inline frame or "iframe" is dynamically created with certain attributes. Because the iframe is being created from within the webpage, there is no security-context issue, and data can be inputted to it from a third-party party source. In one embodiment, this process is similar to the original rendering of the webpage. Recall, historically, features of modern browsers restrict access across domains. But because the iframe is dynamically created within one of a publisher's containers (such as 120A-C), there is no security issue.

Thus, at a step 220, advertising data 130 is retrieved. Moreover, advertising data 130 can be retrieved from an ad-delivery system 128 that resides in a different domain than that of publisher 126. Still further, because the iframe is dynamically created using a publisher's container, attributes can be changed. That is, the iframe can be resized, relocated, or have other attributes that relate to its presentation modified, such as a viewable attribute that allows the advertisement to be hidden. Thus, embodiments of the present invention allow for the creation of objects that can be manipulated by a user even though those objects house content from a third party; namely, a party other than the publisher.

At a step 222, refreshed advertisements are presented in containers 120A-C based on advertising data 130. In some embodiments, an iframe is dynamically created in the containers, after having cleaned the data associated with a former iframe. In other embodiments, the data in the containers can be modified.

Another illustrative method for practicing an embodiment of the invention is depicted in FIG. 2B and referenced generally by the numeral 230. At a step 232, a webpage begins rendering. At a step 234, an application such as application 122, or equivalent, registers potential triggering events that can invoke an advertisement-update process. We previously mentioned some illustrative triggering events that are contemplated within the scope of the invention, such as clicking on various components in the webpage or acknowledging an input of user data. It is also the case, as previously mentioned, that certain triggering events are wholly user independent. An illustrative type of such an event would be the lapse of a certain amount of time. Thus in a timer scenario, when a first portion of a website is updated after a certain amount of time, the remaining content on the rest of the webpage will also be updated instead of only that portion to which the timer relates.

At a step 236, advertisement containers of a webpage are registered. As previously mentioned, illustrative advertisement containers are 120A through 120C. A container can be any type of html element. For example, a container may be as simple as the rendering of <div id='ad1'>.

At a step 238 application 122 receives an indication that at least one of the triggering events has occurred. Thus, at a step 240, perhaps only certain containers will have their content updated. It may be the case that not all containers on a webpage are to have their content updated. Thus in this embodiment, those containers whose content are to be updated is identified.

At a step 242, advertisement data 130 is accessed even though it is stored in a different domain than that of publisher 126, and it is used to present fresh advertising content in the advertisement containers at a step 244.

Turning now to FIG. 2C, another illustrative method for practicing an embodiment of the present invention is provided and referenced generally by the numeral 250. In this embodiment, a webpage begins rendering at a step 252. At a step 254, application 122 registers objects that can be used to present advertising data.

At a step 256 various triggering events are registered that may trigger an update process that updates at least a portion of the webpage, but not at least some other portion of the webpage. Briefly skipping ahead to FIG. 5 for example (which will be explained below), one can see a first portion 516 of a webpage as well as a second portion 522. Portion 522 may not update, even though portion 516 does. Thus, there may be a first portion of the webpage that updates asynchronously with another portion of the webpage.

Returning to FIG. 2, at a step 258, application 122 receives an indication that a triggering event has occurred. Incident to receiving such indication, at a step 260, application 122 facilitates the dynamic creation of at least one iframe within at least one of the objects that can receive advertising content. Thus, in this embodiment, iframes are dynamically created within the existing containers 120A-C that the publisher caused to be presented in webpage 116.

These iframes are automatically populated at a step 262 with third-party advertising that is stored outside of a domain in which the publisher 126 resides. Thus, third-party advertising content is presented in the dynamically created iframes, and this is allowed to occur because the iframes were created from within the publisher's already existing content.

Figure 3:
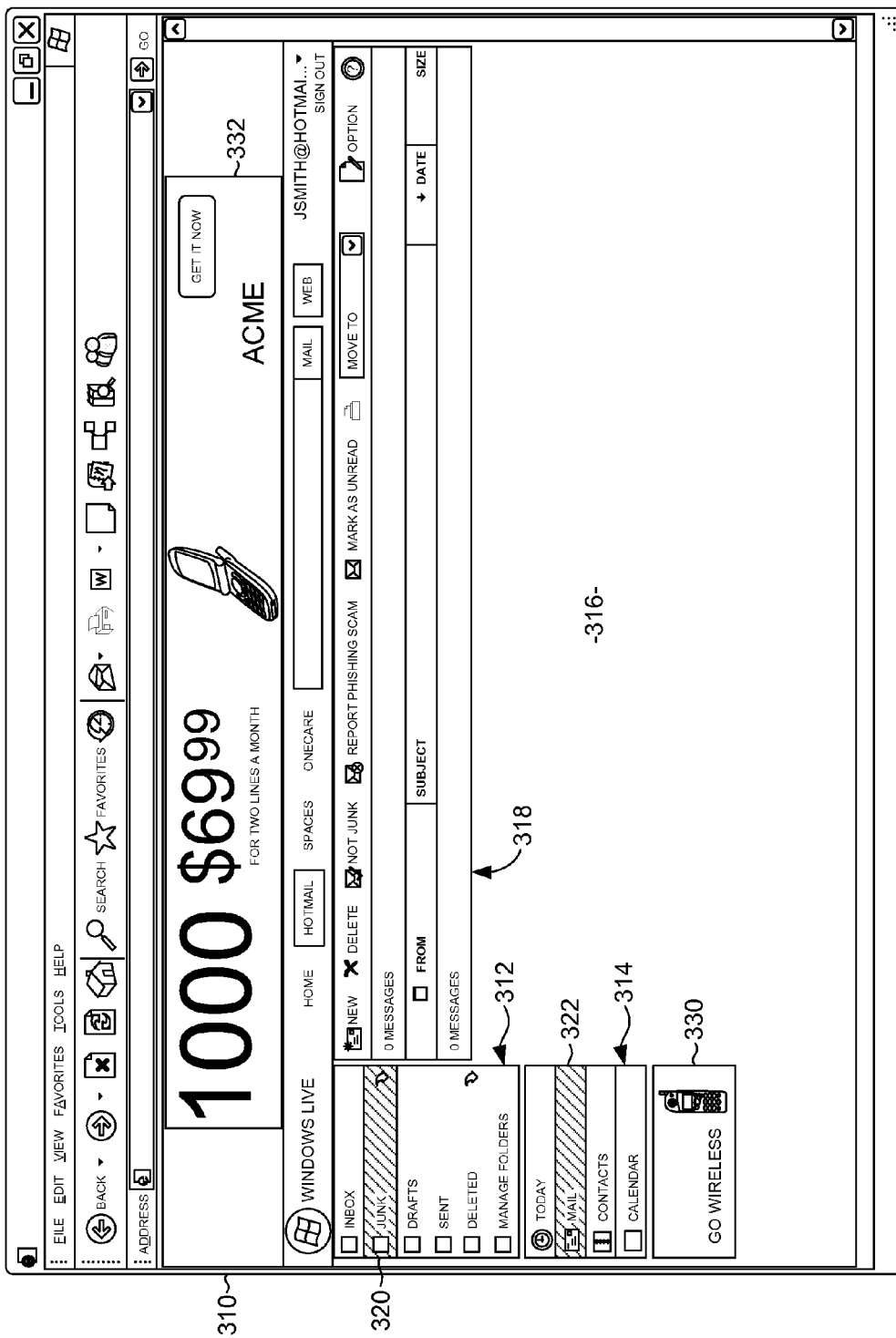
FIGS. 3-7 depict illustrative screenshots that convey various aspects of embodiments of the present invention.

Turning now to FIG. 3, an illustrative screenshot is provided that will help explain aspects of the invention, and is generally referenced by the numeral 310. Screenshot 310 depicts a first portion 312 of a webpage that illustratively shows an email-management environment. Another control 314 illustrates other aspects that might be offered by the webpage. Another portion of webpage 310 is referenced by numeral 316. Area 316 is a different portion of a webpage than that of 312 and 314 in one embodiment. Thus, the controls referenced by numerals 312 and 314 may not change while the content in portion 316 does change. For example, the messages of a junk inbox are presented by control 318. An indication that the junk mailbox is being viewed is shown by numeral 320. An indication that one is observing mail is referenced by numeral 322.

Possibly still another portion of a webpage is referenced by numeral 330. Portion 330 may be a first advertisement container, and it may reside in a portion different than that of 316. As illustratively shown, container 330 includes an advertisement with a tag line "go wireless." Still another advertisement container is referenced by numeral 332.

Assume now that an individual clicks the "inbox" control. Doing so would transition a user to a screenshot of FIG. 4, which is referenced generally by the numeral 410.

Figure 4:
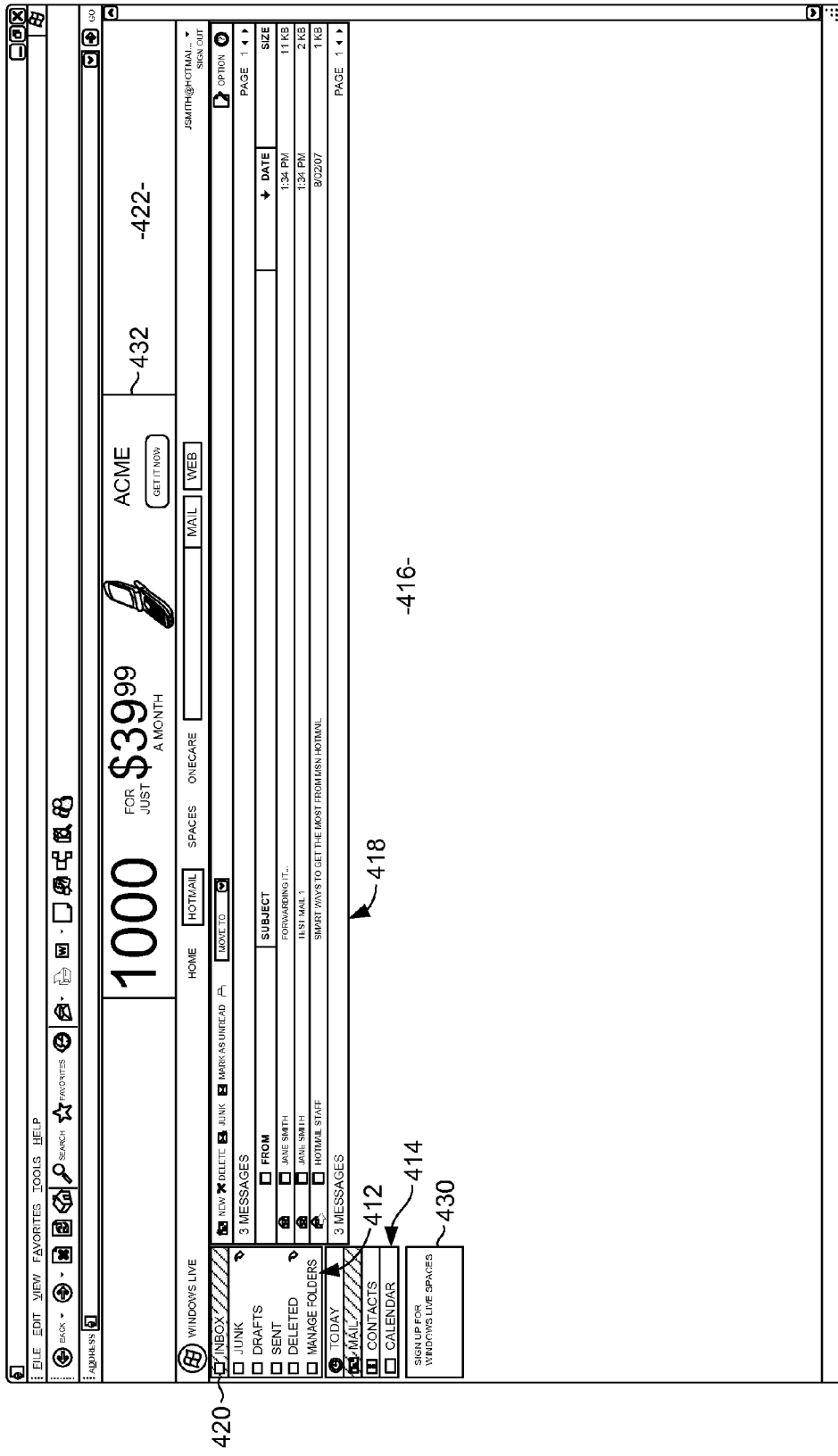

As shown in FIG. 4, where like references refer to like elements, area 412 is the same as that of 312, except that now the "inbox" is indicated as being selected by numeral 420. Similarly, control 414 is the same as that of 314. But area 416 has now been changed. Area 416 now shows those messages that are in a person's inbox, shown by numeral 418. Thus, the portion of the website in which control 414 resides was not changed, while another portion 416 was changed.

Absent the present invention, the advertisement content in container 330 would not have been updated because that portion of the website did not update. But by way of the technologies described herein, the advertisement data within control 430 did update. It now includes the text "sign up for windows live spaces" instead of "go wireless" of control 330 in FIG. 3.

Moreover, area 422, still another area, includes another container 432. Absent the present invention, because a change occurred in area 416, and that change could be isolated to area 416, the advertisement content in container 432 would not have been updated. But because an application, such as application 122 (which in some embodiments may be server controlled, or remotely executed) was able to receive an indication of the triggering events such as the user clicking on the "inbox" control, it was able to redraw a new iframe in container 432, and have the content of that iframe freshly populated with new advertising content. As shown, the advertising content in control 432 is different than that of 332 in FIG. 3.

Figure 5:
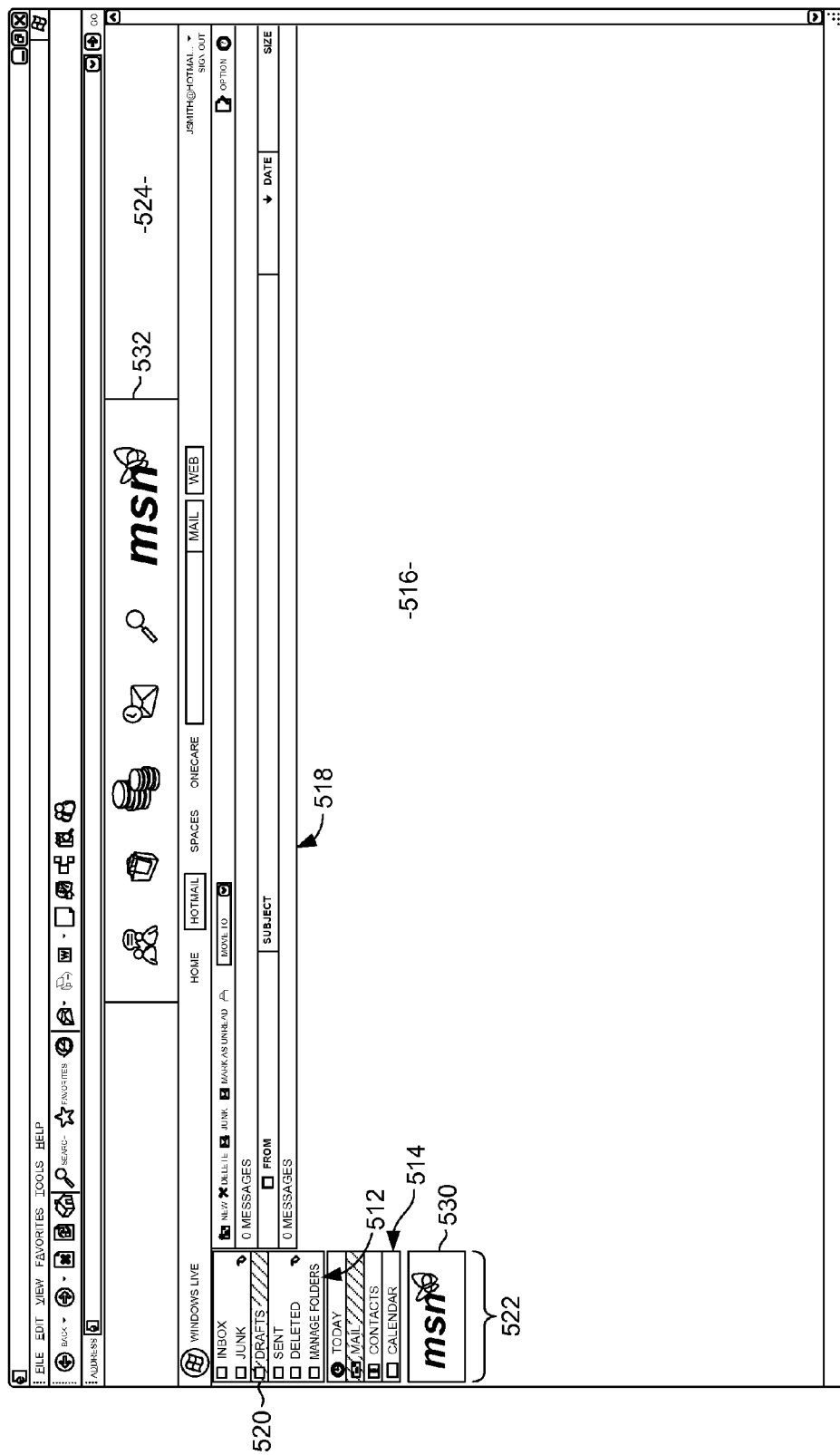

Similarly, if a user were to select the "drafts" control, then a scenario as depicted in FIG. 5 might occur. FIG. 5 depicts an illustrative screenshot generally referred to by the numeral 510 that includes a first portion 522 (or 512 or 514, but which are actually shown as components of area 522 in this example) and another portion 516. As was previously the case, the content in area 516 has changed but the substance of the area generally referred to by numeral 522 has not changed. An advertisement container 530 is included within area 522, which did not change incident to a user selecting the "drafts" control 520.

Historically, and absent the present invention, if webpage 510 were coded in an AJAX format, then the advertisement in container 530 would not be updated when a user selected the "drafts" control because that area 522 did not change. But by way of an embodiment of the present invention, application 122 observed an indication of the triggering event, and caused that advertising content in container 530 to be refreshed. Similarly, the advertising content in container 532 was updated even though it resided in possibly still another area 524.

Figure 6:
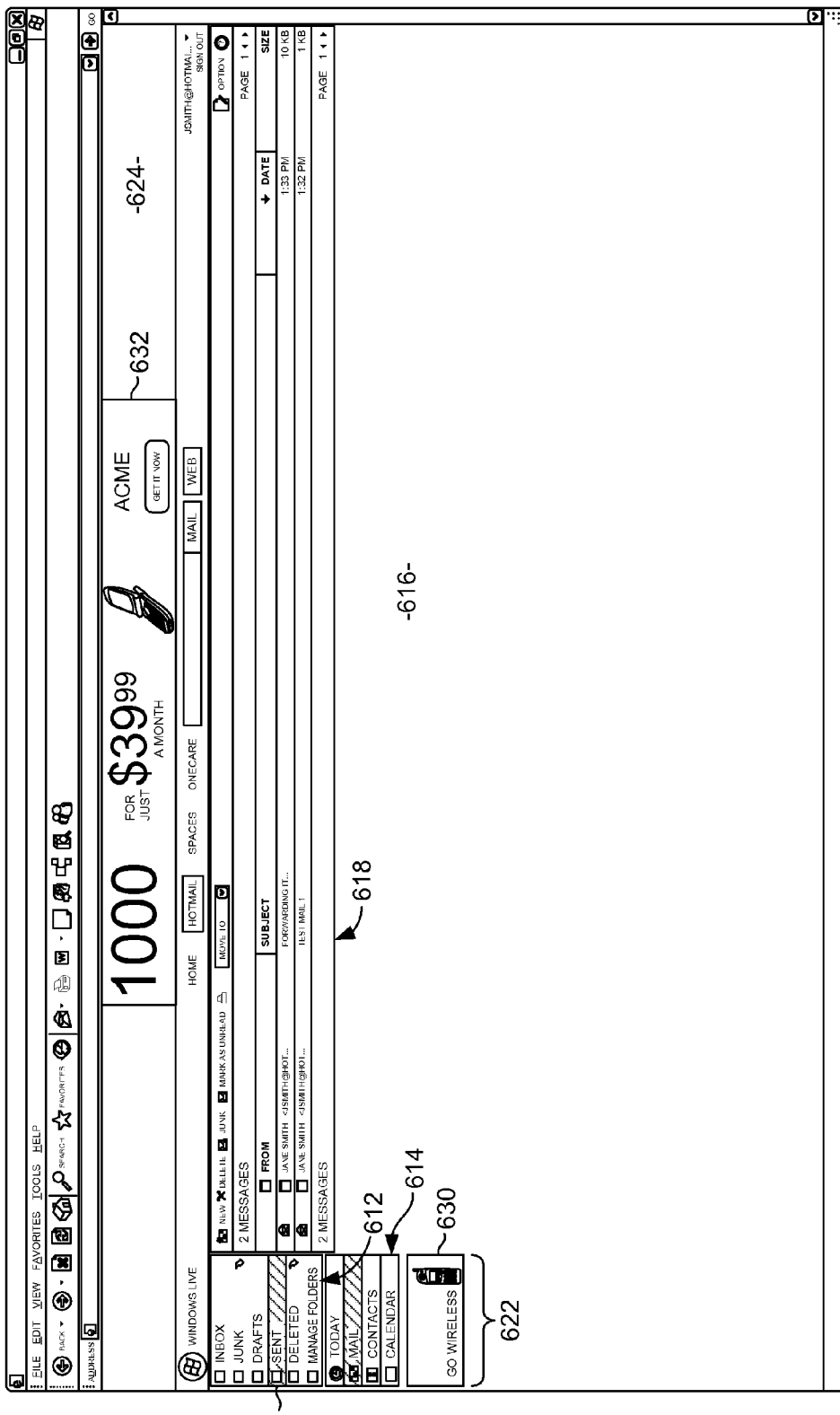
Figure 7:
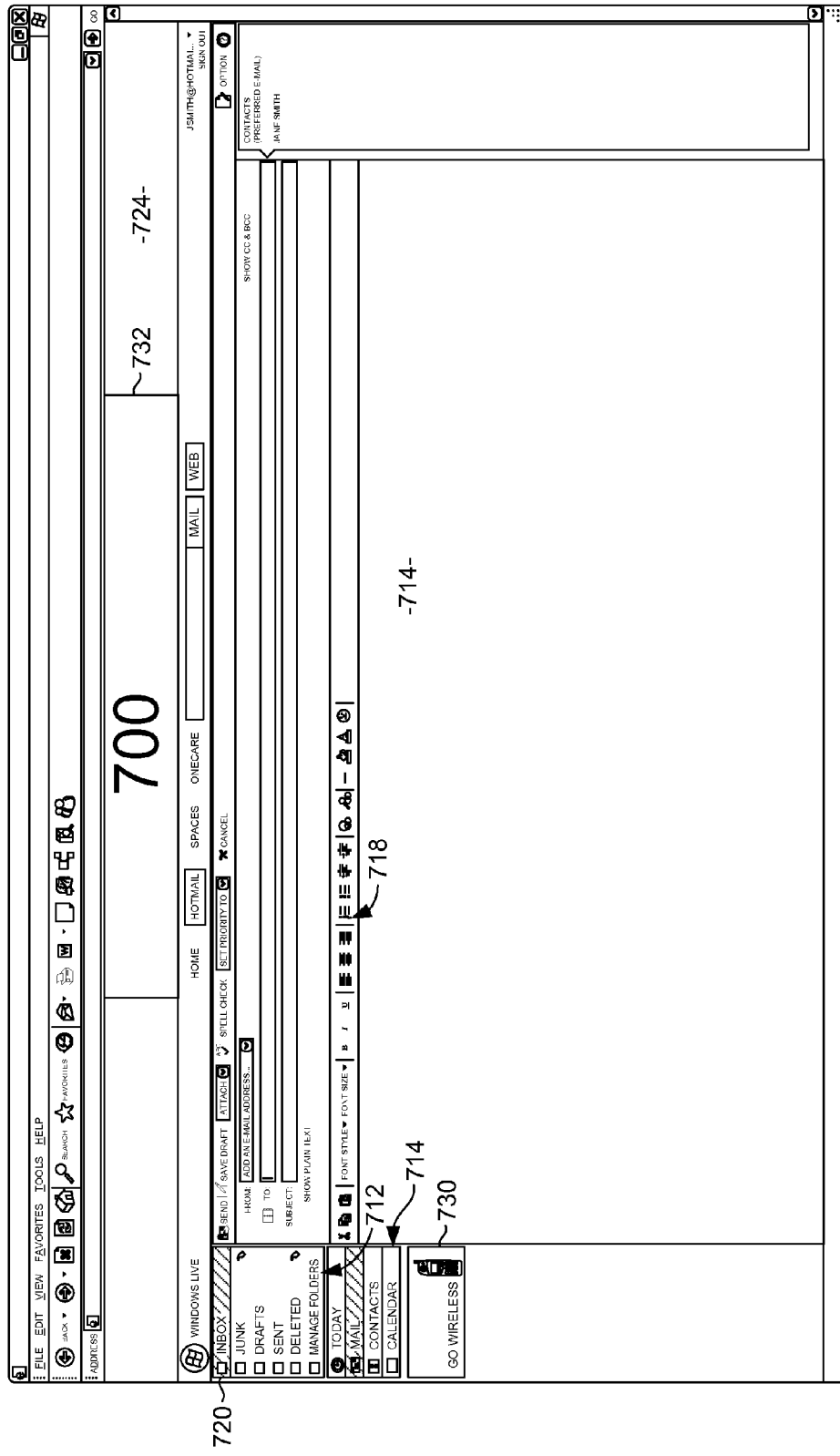

In a final illustrative example, a user selects the "sent" control as shown in FIG. 6, which causes the advertising content in container 630 to be updated with respect to that of 530 in FIG. 5 as well as the advertising content in container 632 to be updated with respect to that of container 532 in FIG. 5. The email control 618 has changed in a portion 616 of the website, while another portion 622 was not changed.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-executable instructions embodied thereon that, when executed by a computing device, perform a method of sourcing advertisements on a webpage developed using asynchronous JavaScript and XML ("AJAX") techniques and that is associated with a first domain with advertisement data associated with a second domain even when the webpage includes a first portion that is updated independently or asynchronously with updating a second portion, the method comprising:

while programmatic code is being processed to render the webpage at the computing device, beginning an initialization process that comprises, (1) identifying a set of advertisement containers that are separate but concurrently displayed sections within the webpage that will present advertisements, the set of advertisement containers comprising the second portion of the webpage and, without an advertisement-update process, the set of advertisement containers being refreshed independently of the webpage and the first portion of the webpage, and (2) identifying a triggering action associated with the first portion of the webpage that, when the triggering action occurs, causes the first portion of the webpage to be refreshed and triggers the advertisement-update process that is capable of updating all advertisements of the webpage, including those in the first and second portions, the triggering action being the occurrence of an Nth frame of a video that is presented in the first portion of the webpage; and incident to the occurring of the triggering action, initiating the advertisement-update process that comprises, (1) from within the webpage, dynamically creating an inline frame ("iframe") that is to be presented in the second portion of the webpage, the iframe having a set of attributes associated therewith, (2) retrieving at least a portion of the advertising data to present an advertisement in the iframe, and (3) presenting the advertisement in the iframe, wherein presenting the advertisement in the iframe includes presenting the advertisement in a screen area previously occupied by one or more of the advertisement containers.

2. The media of claim 1, wherein the programmatic code is processed by a network browser.

3. The media of claim 1, wherein the advertisements that can be presented in the advertisement containers include one or more of still-image content;
video content;
audio content;
programmatic animations;
form functionality;
an HTML representation; and
a Javascript representation.

4. The media of claim 1, wherein presenting the advertisement in the iframe includes removing data that was previously occupied by a control that is being replaced by the iframe.

5. The media of claim 4, wherein the removing data includes removing data from memory of a computing device being used to facilitate display of the advertisement.

6. The media of claim 1, wherein the attributes of the iframe include one or more of:
a location indication that indicates a location on the webpage;
a size indication; and
a viewable attribute that allows the advertisement to be hidden.

7. The media of claim 1, further comprising providing for the modification of the set of attributes of the iframe.

8. The media of claim 7, wherein providing for the modification of the set of attributes is accomplished by creating the iframe in a security context that is common to the webpage.

9. One or more computer-readable storage media having computer-executable instructions embodied thereon that, when executed, perform a method of sourcing advertisements on a webpage developed using asynchronous JavaScript and XML ("AJAX") techniques and that is within a first domain with advertisement data that is stored outside of the first domain even when the webpage includes a first portion that is updated independently or asynchronously with updating a second portion, the method comprising:
registering a triggering event that is associated with the first portion of the webpage and that, when the triggering event occurs, automatically invokes an advertisement-update process to refresh a set of advertisement containers that are included in the second portion of the webpage, wherein the triggering event is the occurrence of an Nth frame of a video that is presented in the first portion of the webpage;
registering the set of advertisement containers that are included in the second portion of the webpage and simultaneously present the advertisements and are not automatically refreshed with the first portion of the webpage;
receiving an indication that the triggering event has occurred; and executing the advertisement-update process while the webpage is presented to a user, the advertisement-update process including:
identifying at least the set of advertisement containers as advertisement containers whose advertisement content is to be updated, thereby defining a set of identified advertisement containers,
accessing the advertisement data that is stored outside of the first domain to receive a fresh advertising content,
creating at least one inline frame (iframe) within at least one of the identified advertisement containers, and
presenting the fresh advertising content in the iframe within the at least one of the identified advertisement containers in the webpage.

10. The media of claim 9, wherein registering the triggering event includes registering the triggering event with a portion of programmatic code that is launched while the webpage is initially rendered.

11. The media of claim 10, wherein registering the set of advertisement containers includes registering the set of advertisement containers with the portion of programmatic code that is launched while the webpage is initially rendered.

12. The media of claim 9, wherein the fresh advertising content is the same advertising content that was presented prior to updating.

13. One or more computer-readable storage media having computer-executable instructions embodied thereon that, when executed by a computing device having a processor and a memory, perform a method of updating third-party advertising content of a webpage developed using asynchronous JavaScript and XML ("AJAX") techniques, the method comprising:
during an initial rendering of the webpage,
(1) registering a set of objects within a first portion of a webpage that each simultaneously present advertising data, the set of objects being separate from but displayed concurrently with a second portion of the webpage and the set of objects not being automatically refreshed with the second portion of the webpage, and
(2) registering a triggering event associated with the second portion of the webpage that, when occurs, automatically triggers, an update process that updates at least the second portion of the webpage but not the first portion of the webpage, the triggering event including the occurrence of an Nth frame of a video that is presented in the second portion of the webpage;
when the triggering event occurs, causing the first portion of the webpage to be refreshed by dynamically creating at least, one inline frame (iframe) within at least one of the set of objects of the webpage that present advertising content;
automatically populating the iframe with third-party advertising content that is stored outside of a domain in which the webpage resides, the iframe being within a security context that is common to the webpage, wherein the populating occurs while the webpage is presented to a user; and
facilitating a modification of a set of attributes associated with the dynamically created iframe, wherein the set of attributes includes one or more of a size-related indication, a visible-attributes indication, a z-level indication, and a location-related indication.

* * * * *

UNITED STATES PATENT AND TRADEMARK OFFICE
CERTIFICATE OF CORRECTION

PATENT NO. : 8,131,591 B2
APPLICATION NO. : 11/853908
DATED : March 6, 2012
INVENTOR(S) : Sunitha Gorty et al.

It is certified that error appears in the above-identified patent and that said Letters Patent is hereby corrected as shown below:

In column 9, line 12, in Claim 3, after "of" insert -- : --.

In column 10, line 48, in Claim 13, after "least" delete ",".

Signed and Sealed this
Twenty-fifth Day of December, 2012

David J. Kappos
*Director of the United States Patent and Trademark Office*